United States Patent [19]

Cordova et al.

[11] Patent Number: 4,687,796

[45] Date of Patent: Aug. 18, 1987

[54] OPTIMUM FORMULATION REGIONS OF REINFORCED THERMOSET COMPOSITES

[75] Inventors: David S. Cordova, Midlothian, Va.; Hugh H. Rowan, Chapel Hill, N.C.; Leroy C. Lin, Richmond, Va.

[73] Assignee: Allied Corporation, Morris Township, Morris County, N.J.

[21] Appl. No.: 812,548

[22] Filed: Dec. 23, 1985

[51] Int. Cl.$^4$ ................................................. C08K 7/14
[52] U.S. Cl. .................................... 523/466; 523/527; 524/513
[58] Field of Search ............... 523/400, 444, 466, 500, 523/513, 527; 524/513

[56] References Cited

U.S. PATENT DOCUMENTS

| | | | |
|---|---|---|---|
| 3,789,049 | 1/1974 | Nagasawa et al. | 523/466 |
| 4,343,843 | 8/1982 | Johnson | 523/466 |
| 4,352,897 | 10/1982 | Ogata et al. | 523/513 |
| 4,439,559 | 3/1984 | Osborne | 523/513 |
| 4,529,757 | 7/1985 | Iseler e al. | 523/513 |
| 4,532,275 | 7/1985 | Aito et al. | 523/400 |

FOREIGN PATENT DOCUMENTS 60-69161  4/1985  Japan .................................. 523/444

*Primary Examiner*—Lewis T. Jacobs

[57] ABSTRACT

This invention relates to optimum formulation regions of reinforced thermosetting resin composites incorporating substantially increased filler loadings which have been found to retain the impact strength of formulation regions with substantially less filler loadings. The reinforced thermosetting resin composite of this invention comprises (a) 15 to 23 weight percent resin matrix selected from the group consisting of polyester and epoxy, (b) 5 to 25 equivalent weight percent fiber reinforcement, said fiber reinforcement comprising 0 to 80 volume percent glass fiber and 100 to 20 volume percent high tenacity reinforcing organic fiber selected from the group consisting of polyester and polyamide, and (c) 80 to 52 weight percent inert filler.

4 Claims, 2 Drawing Figures

OPTIMUM FORMULATION REGIONS OF REINFORCED THERMOSET COMPOSITES

FIELD OF THE INVENTION

The invention relates to reinforced composites comprising a thermoset resin matrix such as epoxy resin or polyester resin reinforced with a combination of glass fibers and organic fibers such as polyamide or polyester fiber, and containing inorganic filler.

DESCRIPTION OF THE PRIOR ART

Many reinforced plastic parts require increased toughness or the ability to withstand high rate loading; i.e. impact strength. Increased toughness improves the end use performance. The use of high performance fibers (carbon, boron, aramid) in structural composites is on the technical edge of reinforced plastics. However, these materials do not address the needs of many markets where applications cannot justify the high cost of high performance fibers. Glass fiber has been used in such applications because it is cost effective and provides the stiffness necessary to allow composites to compete with metals. Hybrid composites whereby combinations of glass fiber and organic fiber such as polyester or polyamide yield composites that display the desirable characteristics of both fibers with little or no increase in part cost. Work in injection molded bulk molding compound (BMC) systems has indicated that plastic reinforced with polyester/glass fiber blends offer improved impact strength versus all-glass reinforced composites. The difference in elongation allows polyester to absorb energy after glass has reached its failure limit. Polyester fiber is more resilient than glass and does not break into shorter lengths during processing. Longer polyester fibers in the molded parts contribute to improved impact strength.

Inert fillers are used extensively in reinforced plastics and laminates. Fillers differ from fibers in that they are small particles of very low cost materials.

The need exists for continued improvement in low cost formulations for reinforced composites which provide desired properties at the lowest possible cost.

SUMMARY OF THE INVENTION

Optimum formulation regions of reinforced thermosetting resin composites incorporating substantially increased filler loadings have been found to retain the impact strength of formulation regions with substantially less filler loadings. The reinforced thermosetting resin composite of this invention comprises
(a) 15 to 23 weight percent resin matrix selected from the group consisting of polyester and epoxy,
(b) 5 to 25 equivalent weight percent fiber reinforcement, said fiber reinforcement comprising 0 to 80 volume percent glass fiber and 100 to 20 volume percent high tenacity reinforcing organic fiber selected from the group consisting of polyester and polyamide, and
(c) 80 to 52 weight percent particulate filler.

DESCRIPTION OF THE PREFERRED EMBODIMENT

Figure 1:
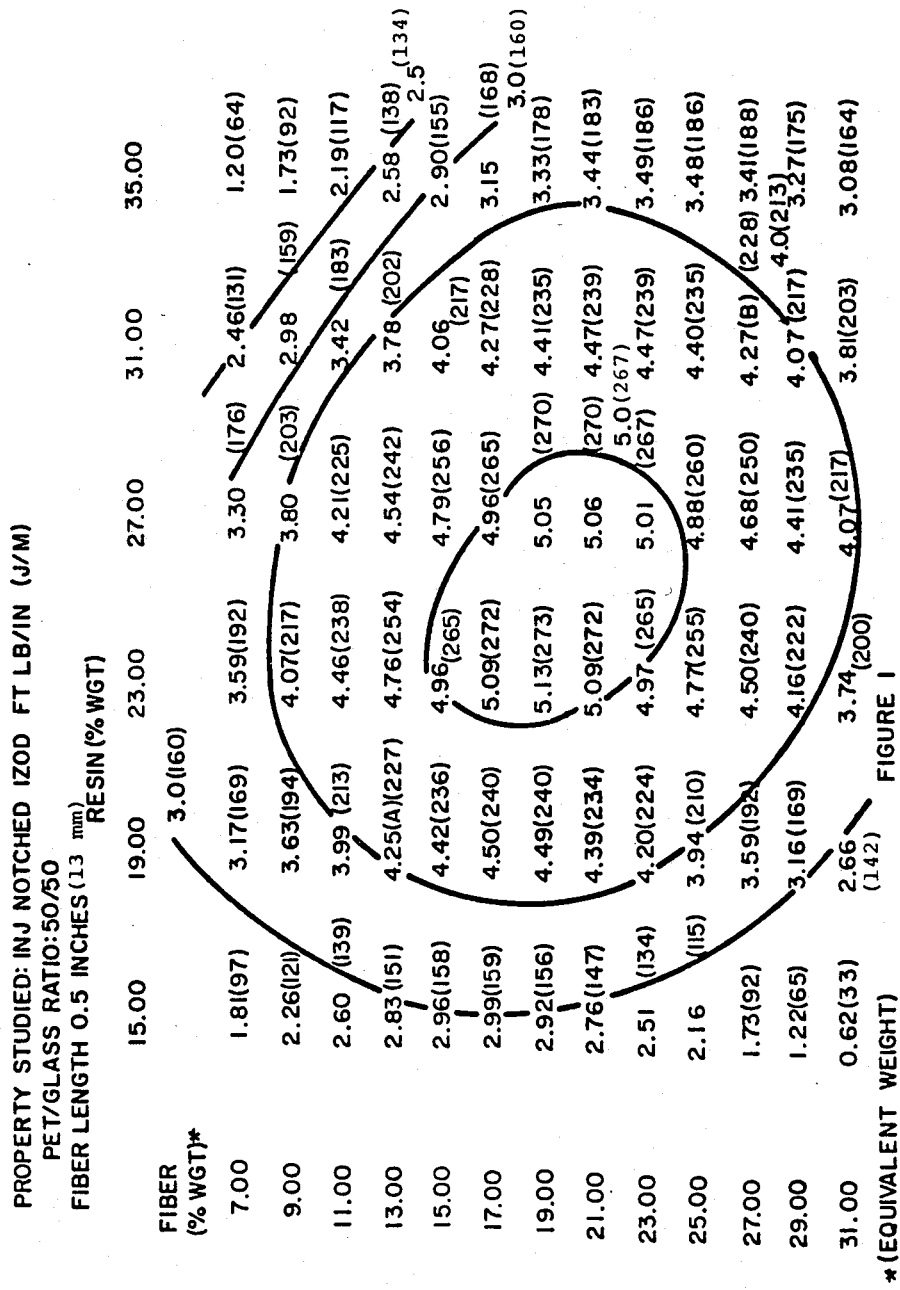
FIG. 1 depicts in tabular form the impact strength values as a function of resin, fiber reinforcement, and filler loadings with a PET/glass fiber volume ratio of 50/50.

The reinforced thermoset plastic composite of this invention comprises a thermoset plastic matrix reinforced with organic fiber selected from the group consisting of polyester and polyamide and, optionally, with glass fiber. The composite is highly loaded with filler.

The thermoset plastic matrix comprises 15 to 23 weight percent of the composite and is selected from unsaturated polyester resins or epoxy resins. The polyester resin is any unsaturated liquid uncured polyester resin suitable for the production of molded composites. Suitable unsaturated polyester resins are well known in the art and include vinyl ester thermosetting resins that consist of a polymer backbone with an acrylate (R=H) or methacrylate (R=CH$_3$) termination

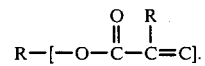

The epoxy resin is any liquid uncured epoxy resin suitable for the production of molded composites. Suitable epoxy resins are well known in the art.

The reinforcing fiber comprises 5 to 25 equivalent weight percent of composite, with the fiber reinforcement comprising 0 to 80 volume percent glass and 100 to 20 volume percent high tenacity reinforcing organic fiber selected from the group consisting of polyester and aliphatic polyamide. Preferred hybrid composites comprise 20 to 80 volume percent glass fiber and 80 to 20 volume percent organic fiber.

The amount of fiber reinforcement in the composite is expressed as "equivalent weight percent". By "equivalent weight percent", the total volume of fiber reinforcement is expressed in terms of the weight of an equivalent volume of all glass fiber. The ratio of glass fiber to organic fiber is expressed as volume percent. In this way the difference in specific gravity of glass fiber and organic fiber is accommodated. For example, if formulation A has 10 equivalent weight percent fiber reinforcement, said fiber reinforcement comprising 100 volume percent glass and 0 volume percent polyethylene terephthalate (PET) fiber, then 100 pounds of formulation A contains 10 pounds glass fiber. If formulation B has 10 equivalent weight percent fiber reinforcement, said fiber reinforcement comprising 75 volume percent glass fiber and 25 volume percent PET fiber, then "100 lbs" of formulation B contains 7.5 pounds glass fiber and [2.5×1.38/2.54=1.36] lbs of PET fiber. The specific gravity of PET fiber is 1.38, of glass fiber is 2.54. In this way it will be seen that "100 lbs" of formulation B actually weighs [90 lbs+7.5 lbs glass fiber+1.36 lbs PET fiber=98.9 lbs]. It will be appreciated that with a greater volume of glass fiber substituted with an equivalent volume of PET fiber, the lighter will be the resulting composite.

Preferred reinforcing polyester fibers include the linear terephthalate polyesters, i.e., polyesters of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4'-dibenzoic acid, 2,8-dibenzofuran-dicarboxylic acid, or 2,6-naphthalene dicarboxylic acid. The glycols may contain more than two carbon atoms in the chain, e.g., diethylene glycol, butylene glycol, decamethylene glycol, and bis-(1,4-hydroxymethyl)cyclohexane. Examples of linear terephthalate polyesters which may be employed include poly(ethylene terephthalate), poly(ethylene terephthalate/5-chloroisophthalate) (85/15), poly(ethylene terephthalate/5-[sodium sulfo]-isophthalate) (97/3), poly(cyclohexane-1,4-dimethylene terephthalate), and poly(cyclohexane-1,4-dimethylene terephthalate/hexahydroterephthalate) (75/25).

Suitable reinforcing polyamides include, for example, those prepared by condensation of hexamethylene diamine and adipic acid, condensation of hexamethylene diamine and sebacic acid known as nylon 6,6 and nylon 6,10, respectively, condensation of bis(para-aminocyclohexyl)methane and dodecanedioic acid, or by polymerization of 6-caprolactam, 7-aminoheptanoic acid, 8-caprylactam, 9-aminopelargonic acid, 11-aminoundecanoic acid, and 12-dodecalactam, known as nylon 6, nylon 7, nylon 8, nylon 9, nylon 11, and nylon 12, respectively.

A preferred reinforcing fiber is a polyethylene terephthalate (PET) fiber, characterized by a thermal shrinkage of up to about 11 percent, preferably 3 percent or less; a modulus after cure of at least about 60, preferably at least 70 grams per denier; and a tenacity of at least 5.5, preferably at least 7 grams per denier. By modulus after cure is meant the modulus of the fiber after exposure in an unconstrained state to curing temperatures for the composite.

Reinforcing fibers are preferably treated with a coupling agent or finish material to enhance compatability and adhesion with the resin matrix. A preferred surface treatment is disclosed in U.S. Ser. No. 624,897 filed June 27, 1984.

Filler comprises 52 to 80 weight percent of the composite. Typical particulate fillers employed include mica, clay, silica, calcium carbonate, diatomaceous earth, alumina, calcium silicate, carbon black, and titanium dioxide. Fillers are selected to provide bulk at low cost and may also confer other valuable properties to the composite such as hardness, stiffness, color, abrasion resistance, reduced thermal expansion, flame resistance, chemical resistance, and a sink for the heat evolved during curing. The filler may be surface treated with a coupling agent or finishing agent to promote adhesion and compatibility with the particular resin employed.

Hybrid reinforced composites of the invention are blends of thermoset resin, glass fiber, organic fiber and filler. Preferred hybrid composites comprise 20 to 80 volume percent glass fiber and 80 to 20 volume percent organic fiber.

Several processes are used to convert these raw materials to reinforced product. The formulation of the unsaturated resin varies with the manufacture and the intended use. The polyesters are usually made from mixtures of saturated dicarboxylic acids and unsaturated dicarboxylic acids. Isophthalic acid is included in the formulation for making sheet- and bulk-molding compounds. The unsaturated polyester resin dissolved in a reactive monomer, e.g. styrene, to yield a liquid containing resin. A catalyst, e.g. benzoyl peroxide, is added to catalyze cross-linking. The liquids are combined with the glass fiber, polyester fiber, and filler to make products by laminating, molding, and winding.

Sheet-molding compound (SMC) and thick-molding compound (TMC) is used in the manufacture of large, reinforced compression and injection moldings. SMC is supplied in rolls ready to be cut to size for placement in molds. Bulk-molding compound (BMC) is similar in formulation to SMC, but is supplied in bulk form or as an extruded rope. BMC is molded by conventional compression molding or in specialy designed injection presses.

EXAMPLES

A specific program was undertaken where the fundamentals of BMC injection molding compounds were studied by reformulating and analyzing the effects of all the major components. Variables of a typical BMC formulation in addition to the injection molding conditions include resin loading, filler loading, fiber loading, the fiber hybridization ratio:polyester/glass fiber, and the polyester fiber length.

Batches were formulated, compounded, injection and compression molded, followed by physical property testing. Results of the testing of injection molded composites are presented in Table 1. In Table 1, PHR stands for parts per hundred part resin.

For each specific formulation, a fifty-pound batch of compound was prepared. The general compound formulation utilized an isophthalic polyester resin, calcium carbonate as filler, and ½-inch E-glass fiber, BMC type fiber reinforced.

COMPET ™ Type 1W71 polyester fiber available from Allied Corporation was used as the organic fiber reinforcement. This fiber has been treated to enhance adhesion to the matrix.

The compounding utilized a sigma blade mixer and standard mixing procedures. The subsequent compound molding utilized a 300-ton C. A. Lawton injection molding press (plunger type). Test specimens were submitted to physical testing following ASTM procedures.

Figure 2:
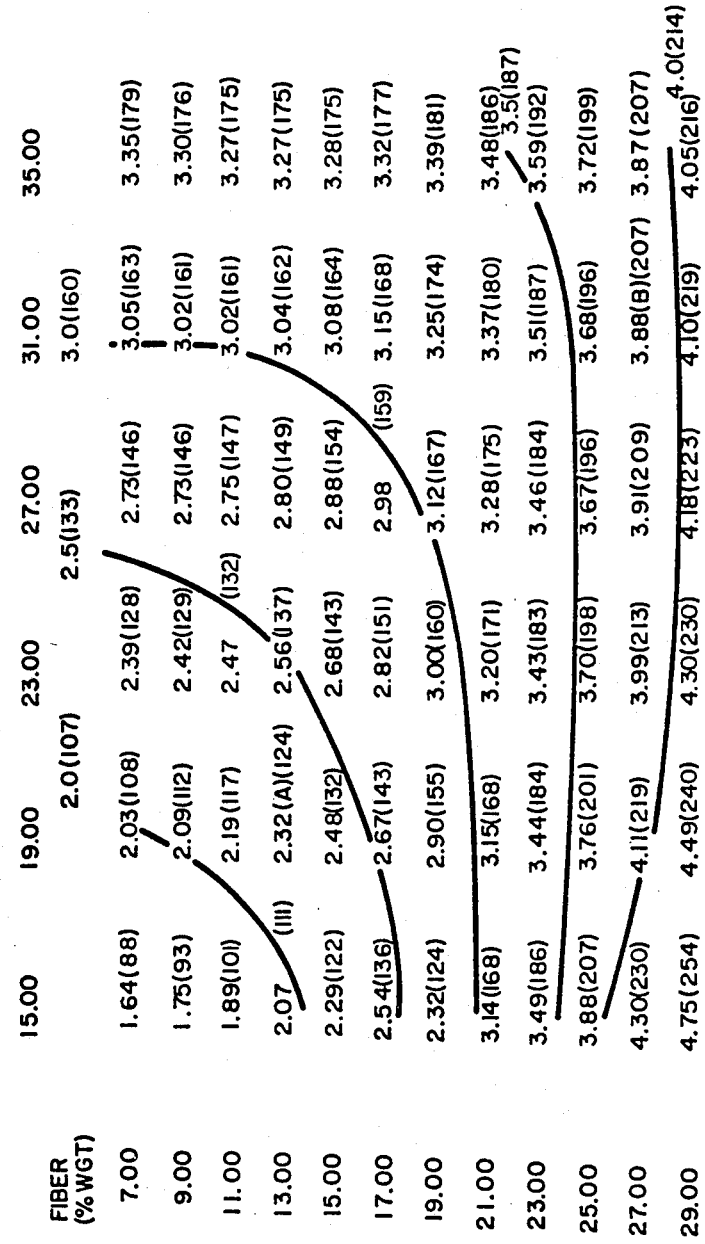
FIG. 2 depicts in tabular form the impact strength values as a function of resin, fiber reinforcement, and filler loadings with all glass fiber reinforcement.

FIGS. 1 and 2 depict in tabular form the impact strength values as a function of both resin and fiber reinforcement loadings. The solid lines represent "contour plots" which allow one to interpret the data by formulation regions and to add a cost factor for each data point considered.

For example, by negotiating any vertical column, these figures indicate the physical property trends as a function of fiber loading at constant resin loading. The case of FIG. 1 represents a typical study of a 50/50 PET/glass fiber reinforcement. The contours represent constant impact values at different compound formulations. Note that for a hybrid system, a circular trend with a maximum has been achieved. This indicates that there is a great potential for modifying a formulation to achieve the same impact at lower cost. For instance, Point B shows an impact value of 4.27 feet pound per inch utilizing 31 percent resin with 27 percent fiber reinforcement; on the other hand, Point A would deliver the same impact but utilize 19 percent resin with 13 percent fiber loading. Clearly, utilizing more of an inexpensive filler results in a more cost effective formulation. FIG. 2 is the graph representation of all-glass fiber formulations. Curve trends do not show the maximum anymore; they appear to flatten in regards to resin increments. Points A and B do not show the advantage depicted in FIG. 1 anymore. Attempts at compounding these formulations using all-glass reinforcement with below 19 percent resin loading proved extremely difficult. Under these conditions, glass did not appear to have good wetout and instead generated heat due to its shear/abrasive characteristics, raising the temperature of the compound to limits where the paste could set up in the mixer. On the other hand, the 50/50 PET/glass fiber mix at the same resin loading did not show such behavior. This is believed to be due to the approximately 45 percent better resin wetout characteristics of PET fiber versus fiberglass.

over 100 percent, with equal values for tensile and flexural strength which are important factors for this industry. Moreover, both formulations were shown to have similar or better cosmetic appearances than the control.

The formulation modification approach described in this application has been found to have excellent agreement in several industrial scale trials completed to date where the potential for more cost effective formulations has been demonstrated.

TABLE 1

BMC INJECTION MOLDING

| I.D. | Fiber Loading Equiv. Wt % | Filler Loading (PHR) | Vol. Ratio PET/Glass | Fiber Length (Inch) | Impact (Ft × Lb/Inch) Notched | Un-notched | R-Notched | Tensile Strength (PSI)E3 | Tensile Modulus (PSI)E6 | Flexural Strength (PSI)E3 | Flexural Modulus (PSI)E6 | Elongation % |
|---|---|---|---|---|---|---|---|---|---|---|---|---|
| AF-1 | 10 | 160 | 0/100 | 0.50 | 2.87 | 5.33 | 2.62 | 3.85 | 1.46 | 10.366 | 1.58 | — |
| AF-2 | 10 | 160 | 25/75 | 0.75 | 3.24 | 4.71 | 2.82 | 3.76 | 1.48 | 9.135 | 1.53 | — |
| AF-3 | 10 | 160 | 50/50 | 0.25 | 3.73 | 3.95 | 3.23 | 3.44 | 1.15 | 8.287 | 1.43 | — |
| AF-4 | 10 | 160 | 50/50 | 0.50 | 4.62 | 4.51 | 3.99 | 2.89 | 1.21 | 7.772 | 1.34 | — |
| AF-5 | 10 | 160 | 100/0 | 0.75 | 8.64 | 10.07 | 8.58 | 3.70 | 1.33 | 6.915 | 1.33 | — |
| AF-6 | 10 | 300 | 0/100 | 0.50 | 8.41 | 9.82 | 7.74 | 3.84 | 1.09 | 6.383 | 1.33 | — |
| AF-6N | 10 | 300 | 0/100 | 0.50 | 2.43 | 2.72 | — | 6.34 | 2.07 | 14.603 | 2.65 | 0.46 |
| AF-7N | 10 | 300 | 25/75 | 0.25 | 2.47 | 2.98 | — | 5.33 | 2.33 | 12.775 | 2.58 | 0.34 |
| AF-8N | 10 | 300 | 25/75 | 0.50 | 2.83 | 3.00 | — | 4.94 | 2.29 | 11.973 | 2.57 | 0.29 |
| AF-9N | 10 | 300 | 50/50 | 0.75 | 5.83 | 6.09 | — | 5.56 | 2.11 | 11.093 | 2.40 | 0.25 |
| AF-10N | 10 | 300 | 100/0 | 0.25 | — | — | — | — | — | — | — | — |
| AF-11N | 10 | 300 | 100/0 | 0.75 | 7.86 | 11.08 | — | 4.06 | 2.03 | 6.824 | 2.11 | 0.19 |
| AF-12 | 30 | 160 | 0/100 | 0.50 | 5.21 | 4.01 | 2.34 | 4.19 | 1.90 | 12.765 | 2.29 | — |
| AF-13 | 30 | 160 | 25/75 | 0.75 | 4.56 | 4.05 | 4.61 | 2.41 | 1.80 | 8.089 | 1.75 | 0.11 |
| AF-14 | 30 | 160 | 25/75 | 1.00 | 4.13 | 4.50 | 3.88 | 4.10 | 1.75 | 11.897 | 1.93 | — |
| AF-15 | 30 | 160 | 50/50 | 0.25 | 2.79 | 5.85 | 3.31 | 3.56 | 1.26 | 11.071 | 1.71 | — |
| AF-16 | 30 | 160 | 100/0 | 0.50 | 7.59 | 13.06 | 8.66 | 3.30 | 0.98 | 7.347 | 1.23 | — |
| AF-17 | 30 | 160 | 100/0 | 0.75 | 11.25 | 5.34 | 10.44 | 2.87 | 1.06 | 7.523 | 1.16 | 0.27 |
| AF-18 | 30 | 300 | 0/100 | 0.50 | — | — | — | — | — | — | — | — |
| AF-19 | 30 | 300 | 25/75 | 0.25 | — | — | — | — | — | — | — | — |
| AF-20N | 30 | 300 | 50/50 | 0.50 | 3.10 | 3.54 | — | 2.93 | 1.92 | 9.095 | 2.45 | 0.13 |
| AF-21N | 30 | 300 | 50/50 | 1.00 | 5.10 | 5.73 | — | 3.26 | 1.87 | 10.152 | 2.43 | 0.19 |
| AF-22 | 30 | 300 | 100/0 | 0.25 | 6.37 | 5.49 | 4.82 | 2.86 | — | 7.321 | 1.81 | — |
| AF-23N | 20 | 300 | 0/100 | 0.50 | 3.40 | 3.18 | — | 5.02 | 2.59 | 12.009 | 2.57 | 0.24 |
| AF-24N | 20 | 300 | 25/75 | 0.25 | 3.01 | 3.62 | — | 5.22 | 2.15 | 13.230 | 2.56 | 0.36 |
| AF-25N | 20 | 300 | 50/50 | 0.50 | 4.82 | 5.87 | — | 4.26 | 2.12 | 11.919 | 2.27 | 0.24 |
| AF-26N | 20 | 300 | 100/0 | 0.75 | 10.95 | 12.87 | — | 3.06 | 1.68 | 6.691 | 1.77 | 0.17 |
| AF-27 | 20 | 160 | 0/100 | 0.50 | 3.15 | — | 2.36 | 4.18 | 1.68 | 11.422 | 1.69 | 0.21 |
| AF-28 | 20 | 160 | 25/75 | 0.50 | 4.85 | — | 3.37 | 4.26 | 1.61 | 11.954 | 1.65 | 0.18 |
| AF-29 | 20 | 160 | 50/50 | 0.75 | 6.03 | 6.05 | 5.64 | 3.47 | 1.44 | 9.693 | 1.59 | 0.23 |
| AF-30 | 20 | 160 | 100/0 | 0.25 | 8.52 | 6.26 | 7.80 | 3.90 | 1.34 | 8.398 | 1.25 | 0.25 |
| AF-31 | 20 | 230 | 0/100 | 0.50 | 3.25 | — | 2.44 | 4.20 | — | 10.139 | 1.90 | — |
| AF-32 | 20 | 230 | 25/75 | 0.75 | 5.59 | 8.32 | 5.99 | 3.94 | 1.82 | 12.416 | 2.20 | 0.24 |
| AF-33 | 20 | 230 | 50/50 | 0.25 | 3.02 | — | 3.52 | 3.98 | — | 10.210 | 1.88 | — |
| AF-34 | 20 | 230 | 100/0 | 0.50 | 9.18 | 8.39 | 8.81 | 3.61 | 1.40 | 7.033 | 1.51 | 0.24 |
| AF-34X | 0 | — | 0/0 | 0.00 | 0.73 | 1.04 | 0.81 | 1.87 | — | 6.678 | 1.73 | — |

TABLE 2

AUTOMOTIVE TMC - INJECTION MOLDING

| I.D. | Fiber Loading Equiv. Wt % | Filler Loading Wt % | Vol. Ratio PET/Glass | Fiber Length (Inch) | Impact (Ft × Lb/Inch) Notched | Unnotched | Tensile Strength (PSI)E3 | Tensile Modulus (PSI)E6 | Flexural Strength (PSI)E3 | Flexural Modulus (PSI)E6 | Elongation % |
|---|---|---|---|---|---|---|---|---|---|---|---|
| Control | 20 | 50.7 | 0/100 | 0.50 | 2.30 | 4.30 | 2.30 | 1.71 | 13.40 | 1.39 | 0.13 |
| Formulation A | 20 | 50.7 | 50/50 | 0.50 | 4.70 | 4.80 | 2.20 | 0.93 | 9.20 | 0.90 | 0.23 |
| Formulation B | 16 | 57.73 | 50/50 | 0.50 | 4.40 | 8.70 | 2.20 | 0.96 | 7.30 | 0.94 | 0.19 |

The modification of standard formulations by reducing resin and fiber loadings, and increasing the filler in an equivalent number, held not only for BMC injection molding but also for other processes such as TMC injection molding. Table 2 represents an example for TMC molded by injection, utilizing an automotive formulation. Note, that formulation A and B have similar composite physical results, even though the B formulation utilizes less fiber and resin loadings. This results in an obvious cost advantage for the B formulation. The impact improvement for both PET fiber formulations is

What is claimed is:

1. A reinforced thermosetting resin composite characterized by enhanced impact strength at high particulate filler loadings comprising:
   (a) 15 to 23 weight percent resin matrix selected from the group consisting of polyester and epoxy;
   (b) 5 to 25 equivalent weight percent fiber reinforcement, said fiber reinforcement comprising 20 to 80 volume percent glass fiber and 80 to 20 volume percent high tenacity reinforcing polyethylene terephthalate fiber characterized by a thermal shrinkage of up to about 11 percent, a modulus after cure of at least about 50 grams per denier, and a tenacity of at least 5.5 grams per denier; and (c) 80 to 52 weight percent particulate filler.

2. The composite of claim 1 wherein said resin matrix is polyester.

3. The composite of claim 1 wherein said polyester fiber is characterized by a thermal shrinkage of up to 3 percent, a modulus after cure of at least 70 grams per denier, and a tenacity of at least 7 grams per denier.

4. The composite of claim 3 wherein said resin matrix is polyester.

* * * * *